US009467928B2

(12) United States Patent
Smiley et al.

(10) Patent No.: US 9,467,928 B2
(45) Date of Patent: *Oct. 11, 2016

(54) ASSEMBLY AND METHOD FOR PREVENTING WIRELESS COMMUNICATION WHILE DRIVING

(71) Applicants: Scott D. Smiley, Wilton Manors, FL (US); Frank A. Vassallo, Safety Harbor, FL (US); Stephen R. Hershman, Melbourne Beach, FL (US)

(72) Inventors: Scott D. Smiley, Wilton Manors, FL (US); Frank A. Vassallo, Safety Harbor, FL (US); Stephen R. Hershman, Melbourne Beach, FL (US)

(73) Assignee: Scott D. Smiley, Wilton Manors, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/974,979

(22) Filed: Dec. 18, 2015

(65) Prior Publication Data

US 2016/0105840 A1 Apr. 14, 2016

Related U.S. Application Data

(63) Continuation-in-part of application No. 13/990,124, filed as application No. PCT/US2011/062427 on Nov. 29, 2011, now Pat. No. 9,252,914.

(60) Provisional application No. 61/417,769, filed on Nov. 29, 2010.

(51) Int. Cl.
| | |
|---|---|
| *H04K 3/00* | (2006.01) |
| *H04W 48/04* | (2009.01) |
| *H04B 1/034* | (2006.01) |
| *H04W 4/02* | (2009.01) |
| *G08B 7/06* | (2006.01) |

(52) U.S. Cl.
CPC ............... *H04W 48/04* (2013.01); *G08B 7/06* (2013.01); *H04B 1/034* (2013.01); *H04W 4/027* (2013.01)

(58) Field of Classification Search
CPC .. H04B 1/034; H04K 2203/22; H04K 3/415; H04K 3/42; H04K 3/45; H04K 2203/16; H04K 3/43; H04K 3/41; Y02T 10/7088; Y02T 10/7077; Y02T 90/127; Y02T 90/163; B60L 11/1818; B60L 2270/34; B60L 11/185; B60L 11/007; B60L 1/04
See application file for complete search history.

(56) References Cited

U.S. PATENT DOCUMENTS

| | | |
|---|---|---|
| 8,254,886 B2 | 8/2012 | Salkini et al. |
| 8,437,741 B2 | 5/2013 | Salkini et al. |
| 8,509,740 B2 | 8/2013 | Salkini et al. |
| 8,606,322 B2 | 12/2013 | Sabol |
| 8,825,011 B2 | 9/2014 | Salkini et al. |
| 9,295,071 B2 | 3/2016 | Salkini et al. |
| 2008/0153497 A1 | 6/2008 | Kalhan |
| 2008/0191551 A1* | 8/2008 | Belanger ............... G06F 13/409 307/10.1 |
| 2008/0305792 A1 | 12/2008 | Khetawat et al. |
| 2009/0215387 A1* | 8/2009 | Brennan ................ H04K 3/415 455/1 |
| 2010/0041265 A1* | 2/2010 | Wang ................ H01R 13/6273 439/353 |

* cited by examiner

*Primary Examiner* — Golam Sorowar
(74) *Attorney, Agent, or Firm* — The Concept Law Group, P.A.; Scott D. Smiley (57) ABSTRACT

A wireless communication network access controller assembly for preventing texting while driving includes a portion shaped to fit within a standard power port of a vehicle. The assembly includes at least one engagement member that places the assembly in a coupling arrangement with the power port of the vehicle and prevents removal of the assembly by the driver. A network access controller creates a local wireless network that is an overlay to a part of an existing wireless network and that prevents wireless communications access to the existing wireless network.

20 Claims, 7 Drawing Sheets

Prior Art

ASSEMBLY AND METHOD FOR PREVENTING WIRELESS COMMUNICATION WHILE DRIVING

CROSS-REFERENCE TO RELATED APPLICATION

This application is a continuation-in-part of U.S. application Ser. No. 13/990,124 (now allowed), filed May 29, 2013, which claims the benefit of PCT Application No. PCT/US11/62427, filed Nov. 29, 2011, which claims the benefit of U.S. Provisional Patent Application No. 61/417,769, filed Nov. 29, 2010, the entirety of which is incorporated by reference herein.

FIELD OF THE INVENTION

The present invention relates generally to preventing wireless communication while driving and, more particularly, relates to a wireless communication network access controller assembly that can be quickly physically secured within a vehicle without wires, the device being non-removable by the driver and prevents the driver's communication device from gaining access to a local network.

BACKGROUND OF THE INVENTION

Modern mobile communication devices, such as cellular telephones, tablets, media players with wireless connections, portable computers, and others, have provided users with a robust line of applications and abilities. Today, the vast majority of phones being put into service are of the "smart phone" type. These devices pack virtually all of the functionality, and possibly more, of traditional laptops into the small footprint of a phone. Of significance, virtually every cellular telephone now provides short messaging server (SMS) capabilities, i.e., "text" messaging, where users can communicate directly with each other by sending short messages. Utilization of any single feature, of which there are many, on the above-mentioned devices, requires significant time looking at the screen. This is especially true since SMSs now can and often do include photographs, videos, graphics, such as emoticons, and other multimedia content. Sending and receiving text messages is, to many people, so enjoyable, they cannot control their urge to do so, no matter the situation or circumstances.

It is undeniable that the use of mobile communication devices, while driving, is distracting to the driver and dangerous to both the driver and those around him or her. For this reason, many states have passed laws banning activities such as texting while driving. Although these laws are in place and most people know the dangers, texting while driving, surfing the Internet, and other distracting activities are still engaged in by drivers on a regular basis.

One group that is notorious for being distracted while driving is teenagers, although members of every age group are just as guilty. With the added component of the above-mentioned mobile devices, many parents are more fearful than ever of allowing their children to drive. One way to ensure children will not text and drive, as just one example of a distracting activity facilitated by a mobile communication device, is to require them to leave their cellular telephones at home. However, this puts the children in a dangerous situation of not having communicative capabilities. Although, in recent years, there was a time when most drivers did not have cellular telephone capability, they at least had the ability to pull over and utilize a pay telephone. Now, because cellular telephones have become so popular, pay phones have become virtually extinct. In addition, parents cannot prevent their children from using a passenger's mobile device while they drive.

One way to prevent communication, including text and voice, is through use of a wireless signal jammer. Generally, the objective of a wireless signal jammer is to interrupt the availability of communication signals in the space of the receiver. Jammers cause enough interference with the communication between cell phones and towers to render the phones unusable.

Currently-available jammers, such as a double and triple band jammers, can block all widely used systems (CDMA, iDEN, GSM, et al.) and are even very effective against newer phones which hop to different frequencies and systems when interfered with. As the dominant network technology and frequencies used for mobile phones vary worldwide, some work only in specific regions such as Europe or North America.

An alternative to "jamming" a signal is a method of tricking a device into thinking it is connected to a cellular network when it is not. One such system and method is described in U.S. Pat. No. 8,437,741, to Salkini, et al., the entirety of which is incorporated herein by reference. Salkini, et al. describe the use of an intelligent network access controller for use with a wireless network that creates a local wireless network that is an overlay to a part of an existing wireless network. The Salkini et al. intelligent network access controller uses a multi-protocol interface and an access module to prevent wireless communication device access to the existing wireless network by locking wireless communications devices to the network access controller. Once locked, the driver is unable to send or receive data or voice signals from his or her mobile device.

One possible way of preventing mobile communication while in a vehicle is to operate a network access controller or mobile phone jammer within or on the vehicle, thereby temporarily disabling communications to or from the driver's mobile device. However, if such a device is merely placed inside the automobile, the driver could easily remove or disable the device. In addition, if the network access controller or jammer is not powered by the vehicle, its operation will have to depend on batteries—a power supply that is not always dependable. Permanently installing the jammer or network access controller, i.e., bolting and/or hardwiring it into the vehicle, requires tools and the aptitude to do so. With most newer automobiles, this would have to be performed by a professional, which is inconvenient and adds significant cost. Modification can also void warranties and/or reduce the value of the vehicle.

Therefore, a need exists to overcome the problems with the prior art as discussed above.

SUMMARY OF THE INVENTION

The present invention provides an assembly and method for preventing wireless communication while driving that overcomes the hereinafore-mentioned disadvantages of the heretofore-known devices and methods of this general type and that quickly and easily installs within a vehicle without the need for physical alteration of any portion of the vehicle or special wiring. Once installed, the device cannot be easily removed by the user, which forces him or her to refrain from engaging in dangerous mobile communication while the car is in motion.

With the foregoing and other objects in view, there is provided, in accordance with the invention, a wireless communication network access controller assembly shaped to fit within a power port, e.g., cigarette lighter port, of a vehicle. The assembly includes at least one engagement member that has a retracted position and an extended position that extends outwardly from the assembly and places the engagement member in a coupling arrangement with a portion of the power port of the vehicle. The coupling arrangement can be the engagement member extending within a hole in the sleeve of the power port or frictionally engaging the sleeve of the power port. The assembly also includes a locking mechanism operable to selectively move the at least one engagement member from the retracted position to the extended position and a network access controller. The network access controller is operable to appear to nearby communication devices as their normal cellular network and deny cellular network access to those communication devices proximate to the wireless communication network access controller assembly.

In accordance with another feature, an embodiment of the present invention includes an accelerometer, often referred to as a motion sensor, communicatively coupled to the network access controller and operable to detect motion of the vehicle.

In accordance with an additional feature, an embodiment of the present invention includes a processor communicatively coupled to the accelerometer and the network access controller and operable to alter a state of the wireless communication network access controller assembly based on a signal received from the accelerometer.

In accordance with one more feature, an embodiment of the present invention includes a timer, wherein the wireless communication network access controller assembly measures a predefined amount of time after receiving a no-motion signal—a signal that indicates that the vehicle is not moving, i.e., the absence of motion—before automatically allowing the nearby communication devices to reconnect with their local cellular network.

In accordance with a further feature of the present invention, the engagement member is a pivotable arm, an expandable coupler, any protrusion that extends outwardly from the wireless communication network access controller assembly towards the sleeve of the power port, or an intermediate part that goes between the assembly and the sleeve of the vehicle's power port and prevents or inhibits the assembly from being removed.

In accordance with yet another feature, an embodiment of the present invention includes an indicator that visually and/or audibly indicates that the wireless communication network access controller assembly has been tampered with or removed.

In accordance with an additional feature, an embodiment of the present invention includes a detector that is coupled to the indicator, where the detector is operable to detect a force applied to the wireless communication network access controller assembly in a direction away from the power port.

In accordance with a further feature, an embodiment of the present invention includes a detector that is operable to detect a variation of a predefined standing wave ratio at the wireless communication network access controller assembly, thereby indicating an attempt to disrupt proper operation of the wireless communication network access controller assembly.

In accordance with one more feature, an embodiment of the present invention includes an emergency shut-off switch operable to disable the wireless communication network access controller assembly and an indicator that visually and/or audibly indicates that the emergency shut-off switch has been activated.

In accordance with the present invention, a method of preventing wireless communication while a vehicle is in motion includes the steps of manipulating the locking mechanism to a first position where the at least one engagement member is in the retracted position, inserting the assembly within the power port, and manipulating the locking mechanism to a second position where the at least one engagement member is in the extended position and in a mating relationship with a portion of the power port.

In accordance with another feature, an embodiment of the present invention also includes a Global Positioning System (GPS) transmitter, receiver, or transceiver.

Although the invention is illustrated and described herein as embodied in an assembly and method for preventing wireless communication while driving, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an", as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the inventive jamming device.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel short-range wireless communication network access controller assembly for use in a vehicle. The term "wireless communication network," as used herein, is intended to indicate a network that facilitates wireless communication, such as a cellular phone network. The present invention, by preventing the driver from accomplishing distracting communication tasks on his mobile communication device, provides safety to the driver, the passengers, and those in the vicinity while the vehicle is in motion. Embodiments of the invention provide an electronic wireless communication network access controller assembly that is easily physically attached and secured within the passenger area of a vehicle. Once secured, the device prevents its removal by an occupant that does not having permission to do so. In addition, embodiments of the invention provide various safety features that allow communication (1) once the vehicle is stopped or (2) while the vehicle is moving and an emergency situation necessitates a reestablished connection to the network.

The accompanying figures show several advantageous features of the present invention, but, as will be described below, are in no way narrowing, as the invention can be provided in several shapes, sizes, combinations of features and components, and varying numbers and functions of the components.

Virtually all automobiles are provided with a 12 V power port, which has traditionally been used for powering cigarette lighters. The cigarette lighter receptacle (also called a cigar lighter receptacle) in an automobile was initially designed to power an electrically heated cigarette lighter, but became a de facto standard DC connector to supply electrical power for portable accessories used in or near an automobile. Examples of devices that can be operated from a cigarette lighter receptacle include lights, fans, beverage heating devices, and small motorized tools such as air compressors for inflating tires. Many portable electronic devices such as music players or mobile telephones use a cigarette lighter receptacle to recharge their internal batteries or to directly operate from the vehicle electrical system.

Currently, automobiles may provide several 12 V power ports that are intended only to operate electrical accessories, and which cannot be used with a cigarette lighter. Usually, only one 12 V power port near the driver will be able to accommodate an actual cigarette lighter, with other receptacles designated as "12 V auxiliary power outlets" which are not physically able to power a lighter. These ports are also present in boats, planes, buses, trains, and other vehicles. The present invention is intended for use in any such vehicle.

Figure 1:
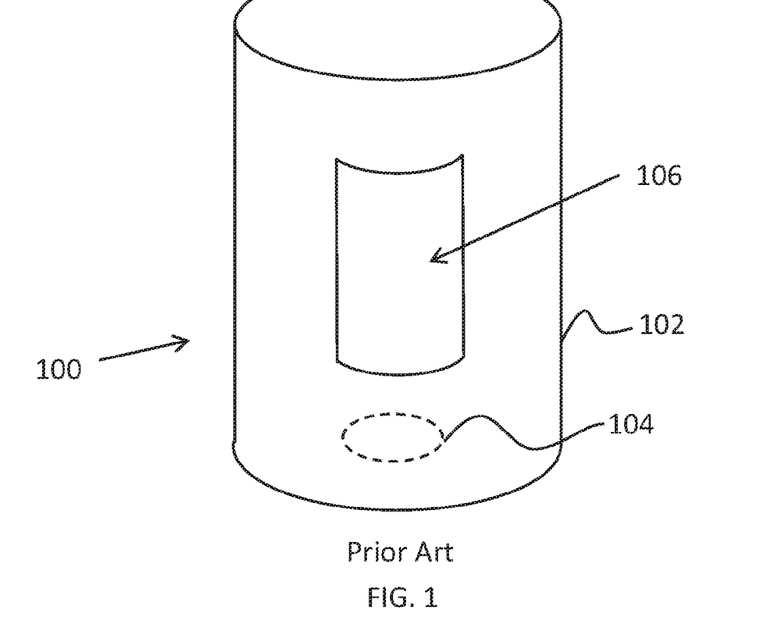
FIG. 1 is a perspective view of a prior art power sleeve found within standard automobiles.

One example of a 12 V power port 100 is shown in FIG. 1. The 12 V power port 100 includes a conductive sleeve 102, sometimes referred to as a "can." At the bottom of the conductive sleeve 102, centered, and not in electrical contact with the sleeve 102 is an electrical contact 104, which is the center part of the plug when viewed end-on, and which carries the positive voltage, whereas the sleeve part carries the negative voltage (which is the "ground" connection for most automobiles, which have a negative ground electrical system). The power port 100 is powered by the automobile so that a DC electrical potential of 12 V appears between the electrical contact 104 and the sleeve 102.

Figure 2:
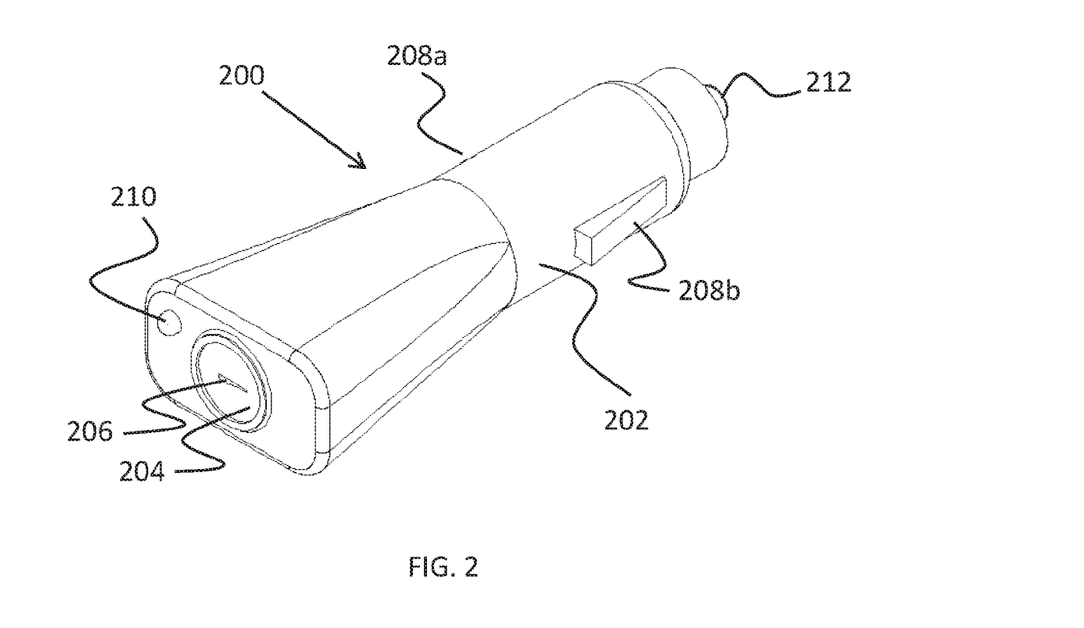
FIG. 2 is a perspective view of the wireless communication network access controller assembly in a locked and activated position with its engagement extended in accordance with the present invention.

FIG. 2 shows a first embodiment of a wireless communication network access controller assembly 200, which includes a body 202 that houses a network access controller (NAC) (not visible in this view) that temporarily prevents or limits allowable communications on an existing wireless network or wireless networks by that network's normal users. Those users are moved away from, or otherwise denied access to the wireless network, even though they are in the geographic area normally covered by the network. Functionality of the NAC is described in detail below and shown in FIG. 4.

Once the body 202 is fully inserted within the power port 100, a first portion 212 of the wireless communication network access controller assembly 200 will be in contact with the electrical contact 104 of the power port 100 and a second portion 208a-b of the assembly 200 will be in contact with the sleeve 102 of the power port 100. Because the wireless communication network access controller assembly 200 is in electrical contact with both the electrical contact 104 and sleeve 102 of the power port 100 when the assembly 200 is within the power port 100, when the automobile applies power to the power port 100, the power supply is energized and the wireless communication network access controller assembly 200 will have available to it 12 VDC, but can operate on other voltage levels, such as 5V or 3.3V, to name just a few specific examples.

It should be noted that newer technologies are constantly being developed and implemented in vehicles. One example is the now prevalent Universal Serial Bus (USB) port that comes as standard equipment on all but the least expensive cars built today. USB ports offer 5V DC standard or less. Although the present invention is described and shown as used in the standard 12V round power port, the invention is in no way limited to such shapes and embodiments. It is clearly envisioned that the same general embodiments/technology described and shown herein can be used in other ports, such as a USB port, among others, with only slight changes easily accomplished by those of skill in the art and that such minor changes are within the spirit and scope of the present invention.

The exterior of the body 202 supports a locking mechanism 204. As shown in FIG. 2, the locking mechanism 204 has a keyhole 206 and is a typical lock device that accepts a key. Of course, this particular type of lock is merely exemplary and the invention is in no way limited to a single type of locking device or key. Extending from the body 202 are a pair of engagement members, in this embodiment, flanges 208a and 208b. The flanges 208a and 208b are physically coupled to the locking mechanism 204 and are activated by the locking mechanism 204. The physical coupling can be accomplished through a simple connecting rod, threaded movements, or any other mechanical connection between the moving locking mechanism 204 and the retractable flanges 208a and 208b. This activation is shown in a comparison between FIG. 2 and FIG. 3.

In FIG. 2, the keyhole 206 of the locking mechanism 204 is in a first position. In this position, the flanges 208a and 208b extend from the body 202. When inserted within the sleeve 102, and the keyhole 206 is rotated into the position shown in FIG. 2, the flanges 208a and 208b will lockingly engage with the openings 106 in the sleeve 102. Once the flanges 208a and 208b are extended and engage with the openings 106 in the sleeve 102, removal of the wireless communication network access controller assembly 200 cannot be accomplished without damaging either the sleeve 102 or the wireless communication network access controller assembly 200. In some vehicles, the sleeve 102 is only provided with a single opening 106. For these vehicles, the flanges 208a and 208b move independently with each other and the installer of the assembly 200 can turn the assembly 200 during installation to align at least one of the engagement members with the single opening. In some embodiments, the assembly 200 is provided with more than two engagement members 208 that each can extend independent of the others. In this embodiment, aligning an engagement member 208 with the opening(s) in the sleeve 102 is made easier. Still, in other vehicles, the sleeve 102 is not provided with openings 106. For these vehicles, the outermost extending tips of the flanges 208a and 208b can feature relatively sharp edges or points that will "dig in" to the inside surface of the sleeve 102. Other techniques of preventing removal of the wireless communication network access controller assembly 200 are disclosed below.

Figure 3:
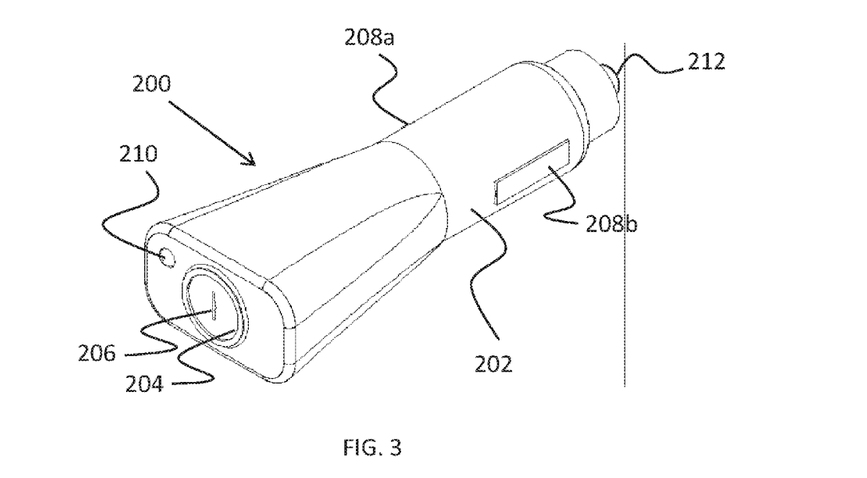
FIG. 3 is a perspective view of the wireless communication network access controller assembly of FIG. 2 in a deactivated position with its engagement members retracted.

Referring to FIG. 3, it can be seen that the keyhole 206 has been rotated to a second position. Rotating the keyhole 206 to this position causes the flanges 208a and 208b to retract into or toward the body 202. Once the flanges 208a and 208b are retracted, insertion or removal of the wireless communication network access controller assembly 200 within the sleeve 102 is a simple task. That is because the flanges 208a and 208b do not extend as far from the body 202 as shown in FIG. 3, so they do not engage with or interfere with parts of the sleeve, namely the opening(s) 106. In some embodiments of the present invention, in addition to the flanges 208a and 208b, the body 202 of the wireless communication network access controller assembly 200 features a pair of tensioned conductive members that extend from the body 202 and serve as electrical contacts for electrically coupling the wireless communication network access controller assembly 200 to the inside surface of the sleeve 102. In other embodiments, the engagement members 208 serve as electrical contacts and additional conductive members are not required.

If access to a key that matches the keyhole 206 is restricted to certain persons, those persons having access can install the wireless communication network access controller assembly 200 within an interior of a vehicle so that its occupants, or more specifically, the driver, cannot remove the device until they gain access to the key. For example, a parent of a young person learning to drive can install the wireless communication network access controller assembly 200 within that young person's vehicle or any other vehicle which a young person is operating. Of course, the present invention is useful for any driver and is not limited to only young drivers. Advantageously, installation of the wireless communication network access controller assembly 200 requires no special wiring or access to any electrical components of the automobile. Installation of the device can be performed by anyone and helps ensure the parent that a young person will not be distracted while driving due to ongoing communication, e.g., texting, talking, surfing the Internet, etc. Installation of the device also provides safety to those around a driver inside the vehicle who might otherwise be susceptible to distraction from mobile devices. The device provides safety to others on the road by ensuring the driver is not distracted.

In one embodiment, the NAC is short-range mobile communication jamming circuitry. The ability to jam mobile communication devices has long been known in the art and is described in now allowed U.S. patent application Ser. No. 13/990,124 to which this application claims priority. The entirety of that application is incorporated herein by reference. Therefore, the specific circuitry for accomplishing short range signal jamming is not disclosed in any significant detail herein. However, the present invention is intended to include any jamming circuitry and technique(s) that can prevent a connection between a mobile communication device, such as a cellular telephone, and its local network. This includes Wi-Fi jamming and is not limited to cellular phones or cellular connectivity. For instance, certain devices, such as laptop computers and WADS®, exclusively use Wi-Fi or other "connectivity" means. In other embodiments the NAC is not a jammer, but is instead an end-to-end solution for selective communications restriction across an entire spectrum of wireless technology, frequency, and access methodology.

Figure 4:
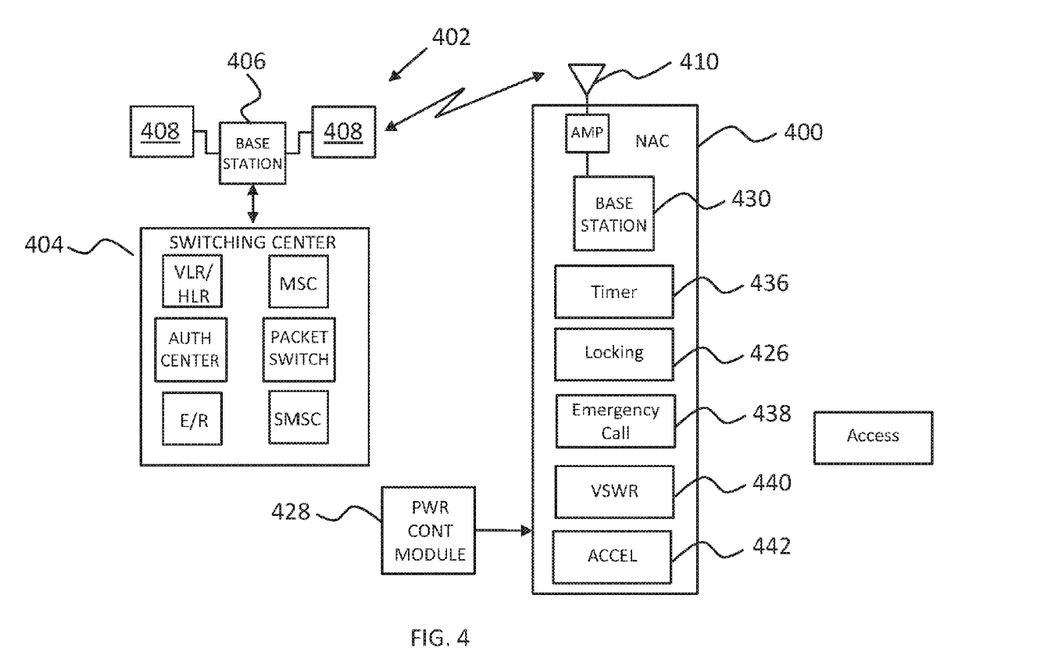
FIG. 4 is a block schematic view of the wireless communication network access controller assembly in accordance with the present invention.

FIG. 4 is a block diagram of a wireless communications network that incorporates an exemplary NAC 400 and other wireless network components to provide access restriction features. In FIG. 4, wireless network 402 includes switching center 404 and base stations 406, through which devices 408 establish wireless communications. Overlaying the network 402 are directional antennae 410 that operate in conjunction with the NAC 400 to restrict or to allow wireless communication from and to the devices 408. The switching center 404 includes standard components that may be found in any switching center, including a Visitor Location Register (VLR) (a database of the subscribers who have roamed into the jurisdiction of the MSC (Mobile Switching Center) which it serves) and a Home Location Register (HLR) (a central database that contains details of each mobile phone subscriber that is authorized to use the core network), authentication center, equipment identification register, a MSC, a packet switch, and a short message service center (SMSC).

Figure 12:
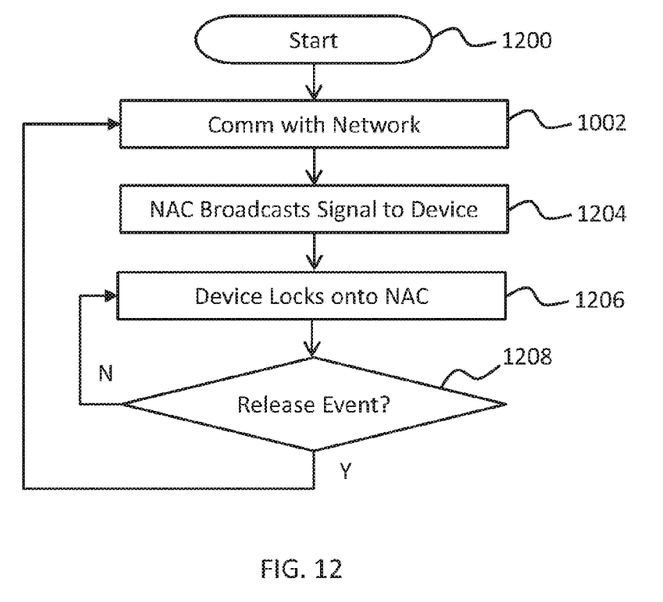
FIG. 12 is a process flow diagram of a method for preventing wireless communication while a vehicle is in motion in accordance with the present invention.

Under normal operating conditions, the subscriber device 408 would automatically register with the network 402 once the device 408 comes within the coverage area of the network 402. However, to provide access restriction, the NAC 400 may be used to "lock" selected devices 408 to the NAC 400, the method of which is shown in FIG. 12, and thus prevent access to the normal wireless network 402.

"Locking" the wireless devices to the NAC 400 indicates that the wireless device 408 is tuned to and has been accepted by the local signal broadcast of the NAC 400. The NAC 400 implements a mimicked signal that follows the signal patterns, parameters, and characteristics of the underlying wireless network 402; however the localized signal is only connected to the NAC 400 and not the wireless network as a whole. The end result is a wireless device 408 that has the appearance of operating on the wireless network 402; however, by virtue of the wireless device 408 being tuned to the local NAC 400 signal, the wireless device 408 is by default "locked" from access to the wireless network outside of the NAC 400. The NAC 400 may be implemented as software, hardware, or a combination of hardware and software. The NAC 400 may be implemented on a suitably programmable processor.

As used herein, the terms "device" or "wireless device" are intended to refer to any electrical components or assemblies that are able to communicate wirelessly with each other or a network, including cellular phones, other wireless handheld devices used for communications, IPADS, laptop computers, personal digital assistants, or other computing devices that include wireless access technology. As used herein, the term "wireless network" is intended to include networks that provide commercial or private wireless access for voice, text, and or data access.

For the purposes of this description, "uplink" communications are those RF messages sent from a cellular device to a cellular network. Transmissions from a cellular device are typically received at the service provider's cellular antenna tower. RF messages sent from a provider's cellular antenna tower to a cellular device are referred to as "downlink" messages. For example, when a cell phone is switched on or off, or when a call is received or placed, the cell phone communicates with the cellular network via RF energy transmitted from the cellular phone. Uplink signals transmitted by a cellular wireless device can be used as the basis for detecting the cellular wireless device.

The wireless communication NAC 400 can simulate downlink messages originating from the subscriber's provider's wireless network 402. The NAC 400 is able to send downlink messages to the mobile device 408 such that the device 408 performs some function requiring an uplink transmission. When the device 408 communicates with the NAC 400 on the uplink, the NAC 400 can begin the process to lock onto the device 408.

In one embodiment, the wireless communication NAC 400 can be used with several provider network types. The wireless communication NAC 400 can be configured to distinguish between responses from different devices. For example, the different provider networks 402 may use different triggers at different times or may use different signaling schemes. The response of the mobile device 408 can be used to dictate the subsequent communication protocol between the wireless communication NAC 400 and the device 408. Once the communication protocol is determined, the wireless communication NAC 400 is able to communicate with the device 408 independent of the detected wireless device's provider network.

The NAC 400 includes a locking module 426, which is used to lock a mobile device 408 to the NAC 400 and to provide indications to the locked mobile device 408 that make it appear that the mobile device 408 is actually registered with its own wireless network 402 that, under normal circumstances, would provide service to the mobile device 408. The NAC 400 also includes a power control module 428, which operates in conjunction with an NAC base station 430 and directional antennae 410, to establish, per FIG. 12, an area within the vehicle subject to the access restrictions imposed by the NAC 400. A timing module 436 may be used to impose or lift temporal limitations on the access restriction functions per FIG. 12. An emergency access module 438 operates as described below through override button 210 to allow the device 408 to reconnect with the network and resume normal operation, at least in part. For example, the emergency access module 438 can allow the locked device 408 to become entirely unlocked and allow the user of the device 408 to make calls or send and received text messages through the network 402. Alternatively, the emergency access module 438 can allow certain access types (e.g., emergency 911 calls from a wireless device 408) while other access types remain blocked.

The NAC 400 operates as a local overlay of the same frequency spectrum and configuration as the wireless network 402. The area of restricted access is directed and limited to short range distance from the wireless communication NAC 400, which is, as much as possible, limited to the interior of the vehicle. The term "short-range," as used herein, is intended to indicate a range of between about twelve inches to about six feet. Communication with the NAC 400 is limited in an effort to not interfere with devices outside the vehicle. The coverage area of the NAC 400 may be enforced by the use of the power control module 428, and directional antennae 410. Once a subscriber's device 408 leaves the restricted access area, i.e., the interior of the vehicle, the subscriber's device 408 re-registers with the wireless network 402 and is no longer controlled (locked) by the NAC 400. Alternatively, when the NAC 400 loses power, e.g., the vehicle is turned off, or when the NAC 400 is disabled, e.g., by the user pushing an override switch, the subscriber's device 408 re-registers with the wireless network 402 and is no longer controlled (locked) by the NAC 400.

Advantageously, the device readily allows mobile communication in cases where it is necessary. More specifically, once the key for the vehicle is rotated to the off position, the power port 100 within the vehicle will no longer receive power and the wireless communication network access controller assembly 200 will no longer operate to prevent communication. Therefore, if the driver must make a phone call or transmit a message, all they need to do is turn the automobile off. The automobile will immediately cease supplying power to the power port 100, which will cause the wireless communication network access controller assembly 200 to, in turn, cease operation due to its own loss of power. If a voltage is still present after ignition is off, the present invention will power down after waiting a sufficient time after the vehicle becomes stationary. Although the automobile could be turned off, for instance, at a stoplight, if necessary, it is envisioned that the driver is likely to simply and safely pull over to the side of the road or to any other safe location and turn the vehicle off.

In a further embodiment of the present invention, the inventive wireless communication network access controller assembly 200 is provided with an override button. One such button 210 is shown in FIG. 2. The override button 210, once pushed, activates the emergency access module 438 (shown in FIG. 4) and releases the locking relationship between the user device 408 and the NAC 400 either temporarily or until the key is used to reset the wireless communication network access controller assembly 200. The override button 210 is useful in cases where the operator of the vehicle requires operation of their mobile device 408 and is not able to or it is inconvenient to turn the automobile off. Advantageously, embodiments of the present invention provide alerting indicators to communicate that the override button 210 has been activated. For example, the override button 210 or other portion of the wireless communication network access controller assembly 200 can feature an LED that glows red once the override button 210 has been pushed. A battery within the wireless communication network access controller assembly 200 ensures the LED remains lit until the keyhole 206 is rotated by a key. In this way, if an operator of the vehicle, e.g., a teenager, disables the inventive wireless communication network access controller assembly 200, the installer, e.g., the operator's parents, will be informed of this disabling of the wireless communication network access controller assembly 200 and can take appropriate action with the operator. Advantageously, the override button 210 and the other above-described features for unlocking the device 408 from the NAC 400 provide consistently available operation of a mobile device, if and when necessary, during operation of the vehicle. However, the user's use of their mobile communication device 408 to communication is limited to situations where the use is absolutely necessary while the vehicle is in motion or at a time when the vehicle is stationary.

The assembly 200 can be provided with an override disable feature, which prevents the override button 210 from having any effect on the NAC 400. This is useful, for example, if the user of the device continuously pushes the override button without a true emergency being present, effectively making the device useless. In this case, the installer of the device can disable this feature. Because the assembly 200 is physically locked into the power sleeve and cannot be removed without a key, the only way for the user to use their mobile device while in the vehicle would be to stop the vehicle. This is particularly useful for strongminded drivers that are not in favor of having their communications disabled by the installer of the device, e.g., teenagers and parents. An example of an override disable button is element 514 in FIG. 5. Advantageously, because the override disable button 514 is on the distal end of the wireless communication network access controller assembly, once the override function has been set to "disabled" and the wireless communication network access controller assembly 200 has been inserted and secured within the power sleeve 102 of the vehicle's interior, the override disable button 514 is not physically accessible to the driver. The driver is then limited to the selections of the installer of the wireless communication network access controller assembly 200.

In accordance with another embodiment of the present invention, the wireless communication network access controller assembly 200 is provided with a voltage standing wave ratio (VSWR) indicator 440 (shown in FIG. 4) that detects and reports significant changes in the transmission attenuation of the wireless communication network access controller assembly 200. In telecommunications, standing wave ratio (SWR) is the ratio of the amplitude of a partial standing wave at an antinode (maximum) to the amplitude at an adjacent node (minimum), in an electrical transmission line. The SWR is usually defined as a voltage ratio called the VSWR, for voltage standing wave ratio. For example, the VSWR value 1.2:1 denotes a maximum standing wave amplitude that is 1.2 times greater than the minimum standing wave value. It is also possible to define the SWR in terms of current, resulting in the ISWR, which has the same numerical value. The power standing wave ratio (PSWR) is defined as the square of the VSWR. A SWR is used as an efficiency measure for transmission lines that conduct and connect radio frequency signals to their antennas.

The VSWR indicator 440 can detect and report to the installer a tampering event, such as the driver of the vehicle covering the wireless communication network access controller assembly 200 with RF shielding, such as aluminum foil, a metal box, and/or metal wire, for example. When the wireless communication network access controller assembly 200 is covered all or partially with a metal shield, the antenna 410 will "feel" an artificial ground and its effective impedance will change to no longer match the impedance of the feedline, which was designed to operate with an antenna radiating in free space. When the antenna 410 and its feedline do not have matching impedances, some of the electrical energy cannot be transferred from the feedline to the antenna. Energy not transferred to the antenna is reflected back towards the transmitter and detected by the VSWR indicator 440, which then lights a light, shows a display message, or otherwise communicates the tampering event to the installer.

In addition, one embodiment of the present invention utilizes an accelerometer 442, shown in FIG. 4, to detect motion of the wireless communication network access controller assembly 200, which, when installed in a vehicle, indicates that the automobile is moving. As long as the accelerometer 442 detects motion, the wireless communication network access controller assembly 200 is operational, thereby preventing the driver from communicating through any wireless device 408. Once the automobile has stopped, the accelerometer 442 will no longer detect motion, i.e., detects an absence of motion, and the wireless communication network access controller assembly 200 can unlock from the mobile device 408. This embodiment is also useful for vehicles with power ports that remain powered even after the vehicle has been turned off.

In one embodiment, the timer 436 can be used in conjunction with the accelerometer 442 to prevent the wireless communication network access controller assembly 200 from operating until the vehicle has been stopped for a predetermined amount of time. This prevents the driver from being able to send and/or receive text messages or other communications at each stop light and then read them in between stops. The timer 436 can be set for, for example, for 4 minutes, which exceeds all regularly-encountered city stop-light cycle times. The timer 436 can be included in a processor-based integration circuit or within a microprocessor.

Figure 5:
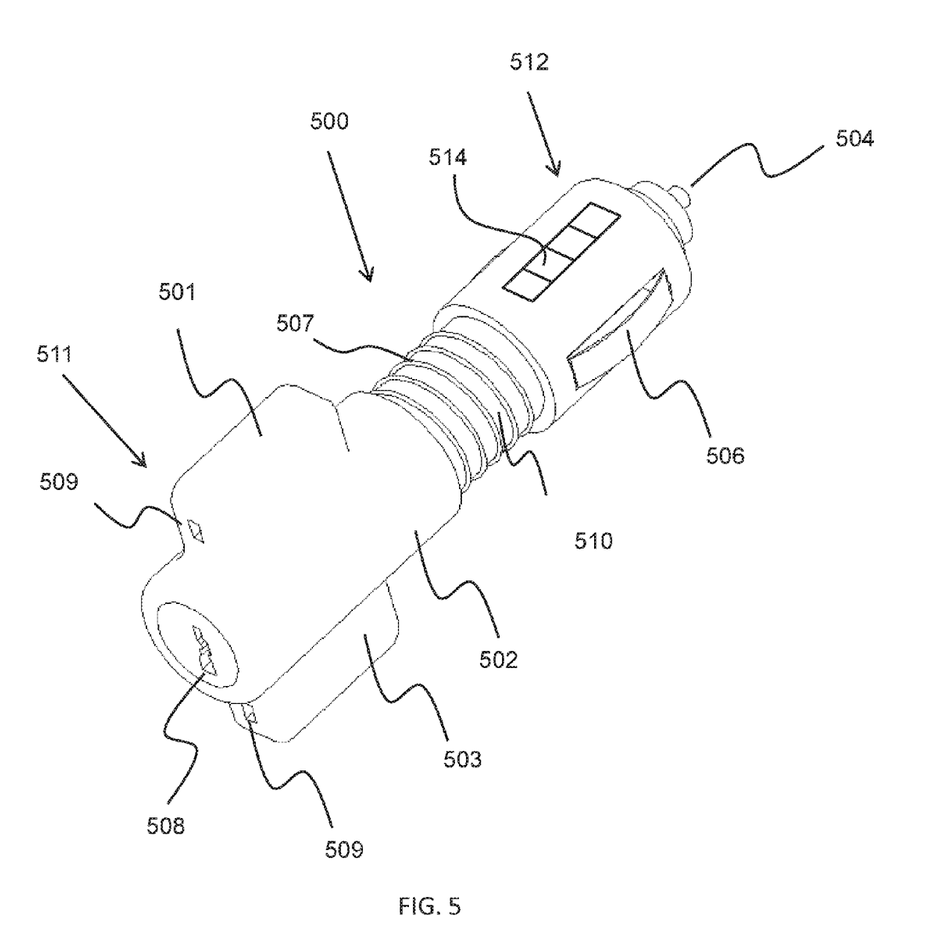
FIG. 5 is a perspective view of a wireless communication network access controller assembly having an expandable securing midsection engagement member in accordance with the present invention.

Referring now to FIG. 5, an additional embodiment of the present invention is shown in a perspective view. The embodiment of the wireless communication network access controller assembly 500 includes an elongated body 502 that houses the electronics, e.g., those shown in FIG. 4, to prevent communication between a mobile device 408 and its network 402. The elongated body 502 of the wireless communication network access controller assembly 500 also features a pair of ear-like extensions 501, 503. The ear-like extensions 501, 503 can be useful for housing the antenna 410, or portions thereof. As will be explained below, the ear-like extensions 501, 503 are also useful for gripping by a user's fingers. The wireless communication network access controller assembly 500 also includes a power connector 504 at its distal end, spring-loaded grounding contacts 506, indicator lights 509 that can be used to indicate an override of the device, as explained above, and a keyhole 508 at its proximal end.

As with the embodiment of the wireless communication network access controller assembly 200 shown in FIG. 2, the wireless communication network access controller assembly 500 of FIG. 5 is also intended to be inserted within a power sleeve of a vehicle and selectively secured within the sleeve. Securing within the sleeve is accomplished with the embodiment of FIG. 5 through a coupler 510 near the midsection of the elongated body 502. The coupler 510 is analogous to an inverse of a commonly-found plumbing-type coupler. For example, the reverse of the PVC CMP Coupling, by the MUELLAR, Corp., part number #160-106. In this embodiment, the coupler 510 serves as an engagement member for selectively locking the wireless communication network access controller assembly 200 into the sleeve. A user is able to rotate the proximal end 511 of the elongated body 502 by gripping the ear-like extensions 501, 503 and performing a screw-like movement. During this movement, the distal end 512 of the elongated body 502 remains stationary and the coupler 510 expands in an outward direction. This expansion places pressure, with a rubber gasket or other frictional element 507, on the interior surface of the power sleeve 102 and prevents the wireless communication network access controller assembly 500 from being removed from the sleeve. Once locked by a key in the keyhole 508, rotation of the proximal end 511 is no longer possible.

Alternatively, a non-illustrated key can be used to turn the keyhole 508, which rotates multiple times to move internal components that cause the coupler 510 to expand in an outward direction and place pressure on the interior surface of the power sleeve 102, thus preventing the wireless communication network access controller assembly 500 from being removed from the sleeve.

In alternate embodiments, elements can be caused to move within an interior of the elongated body 502, thus causing portions of the elongated body to expand outwardly and engage with the power sleeve of the vehicle.

Embodiments of the present invention also allow the wireless communication network access controller assembly 200, 500 to be provided with an intelligent NAC. Examples of intelligent NACs are described in detail in, for example, U.S. Pat. Nos. 8,437,741, 8,509,740, 8,254,886, 8,825,011 and U.S. patent application Ser. Nos. 13/939,403, 13/904,534, and 13/973,244, the entirety of each is incorporated fully herein by reference. Intelligent NACs are able to lock onto a mobile device 408 and prevent data, i.e., text and internet communications as described above, yet allow voice communications to take place over the cellular network. Alternatively, an intelligent NAC is able to interfere with, i.e., prevent, data and voice communication channels but not GPS communications. Therefore, referring still to FIG. 5, embodiments of the present invention provide a communication blocking type selector 514 on the distal end 512 of the wireless communication network access controller assembly 500. The communication blocking type selector 514 allows a user to alter the communication blocking categories of the wireless communication network access controller assembly 500. Advantageously, because the communication blocking type selector 514 is on the distal end of the wireless communication network access controller assembly 500, once a communication blocking type has been selected and the wireless communication network access controller assembly 500 has been inserted and secured within the power sleeve of the vehicle's interior, the communication blocking type selector 514 is not physically accessible to the driver. The driver is then limited to the communications abilities selected by the installer of the wireless communication network access controller assembly 500. Alternatively, the communication blocking type can be determined by connecting the device to a computer through, for instance, a USB cable. In addition, the device can wirelessly receive a communication blocking type selection signal from a controller unit and adjust the communication blocking type values accordingly.

Figure 6:
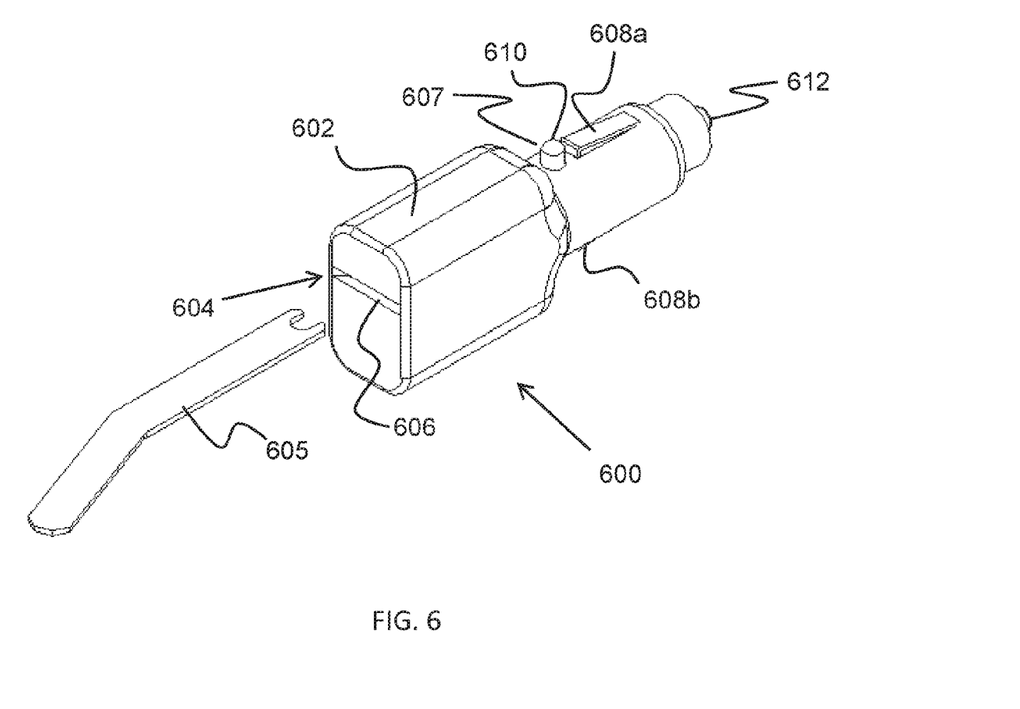
FIGS. 6 & 7 are perspective views of a wireless communication network access controller assembly having an engagement member and a tool for selectively extending/retracting the engagement member in accordance with the present invention.

FIG. 6 shows a wireless communication network access controller assembly 600 with a body 602 that houses short-range NAC circuitry, such as that schematically depicted in FIG. 4. Once the body 602 is fully inserted within a power port 100 of a vehicle, a first portion 612 of the assembly 600 makes contact with the electrical contact 104 of the power port 100 and a second portion 608a-b of the assembly 600 makes contact with the interior surface of the sleeve 102 of the power port 100.

Figure 7:
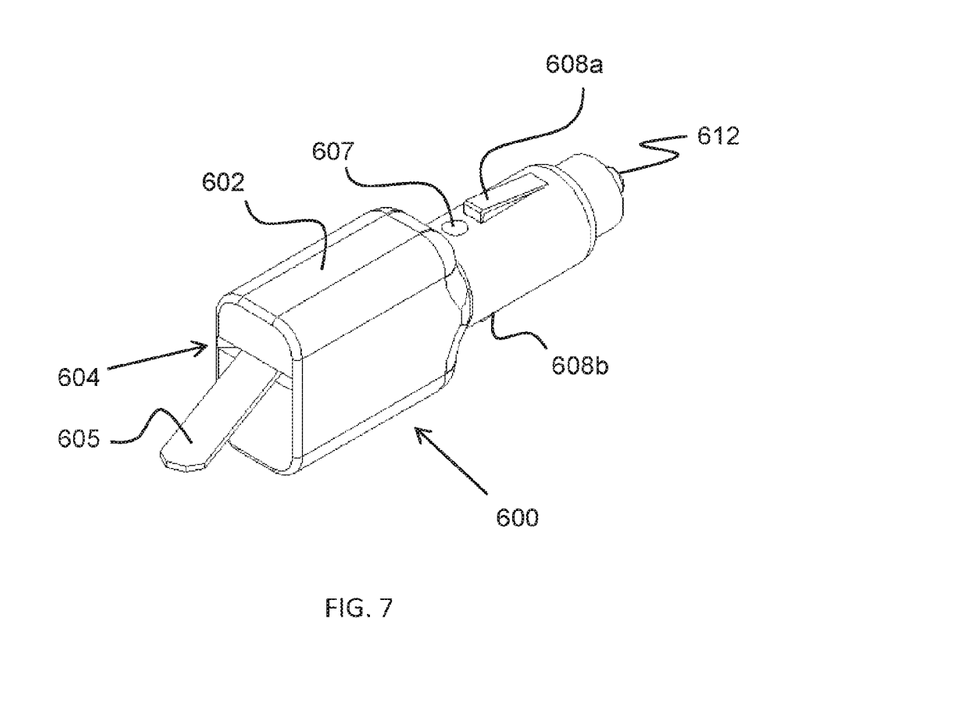

The exterior of the body 602 supports a locking mechanism 604. As shown in FIG. 6, the locking mechanism 604 has an access port 606 that accepts a key tool 605. Of course, this particular type of locking mechanism 604 and key tool 605 are merely exemplary and the invention is in no way limited to the embodiments depicted in the figures. Extending from the body 602 is at least one locking stud 607 that serves as an engagement member with the interior sleeve of the power port into which the assembly 600 inserted. The locking stud 607 is physically coupled to the locking mechanism 604 and is activated, i.e., caused to move, by the locking mechanism 604, which is, in turn, activated by the key tool 605. The physical coupling can be accomplished through a simple connecting rod, threaded movements, or any other mechanical connection between the moving locking mechanism 604 and the locking stud 607, for example, the arrangement depicted in FIGS. 8 and 9. This activation of the locking stud 607 by the locking mechanism 604 is shown in a comparison between FIG. 6 and FIG. 7. In FIG. 7, the key tool 605 is inserted into the access hole 606 of the locking mechanism 604. Once fully inserted, the key tool 605 causes the locking stud 607 to retract to some degree from its most fully-extended position. Once retracted, the wireless communication network access controller assembly 600 can easily be inserted or removed from a power port 100 in the same way most cellular phone chargers are inserted/removed.

Looking back at FIG. 6, the key tool 605 is shown removed from the access hole 606 of the locking mechanism 604. Once the key tool 605 is removed, the locking stud 607 serves as an engagement member that extends from the body 602. When inserted within the sleeve 102, the locking stud 607 engages with the opening(s) 106 in the sleeve 102 and prevents removal of the wireless communication network access controller assembly 600 from the sleeve 102. Once the locking stud 607 is engaged with the opening(s) 106 in the sleeve 102, removal of the wireless communication network access controller assembly 600 cannot be accomplished without damaging either the sleeve 102 or the wireless communication network access controller assembly 600. In some vehicles, the sleeve 102 is not provided with openings 106. For these vehicles, the outermost extending tip 610 of the locking stud 607 features a relatively sharp point that will "dig in" to the inside surface of the sleeve 102 and prevent movement of the wireless communication network access controller assembly 600 relative to the sleeve 102. Other tips may also be used. For example, the tip 610 can be a malleable high-friction material, such as rubber, that will make extraction of the wireless communication network access controller assembly 600 very difficult without damaging the material or the power port 100.

In other embodiments of the present invention, the locking stud 607 is a movable member with at least two discrete positions. The movable member 607 is in its first position once the wireless communication network access controller assembly 600 is inserted within a power port 100. Once in place, a removing force, with reference to the sleeve 102, applied to the wireless communication network access controller assembly 600 moves the movable member 607 to a second position. This second position is one in which the driver of the vehicle cannot alter without a key or key tool and indicates to an observer that the device has been tampered with. Thus, the movable member 607 discourages users of the vehicle from attempting to remove or disable the wireless communication network access controller assembly 600.

In accordance with another embodiment of the present invention, the movement of the movable member 607 triggers a tampering indicator, e.g., sound generator such as a speaker, a piezoelectric tone generator, etc., that constantly or periodically audibly signals that the device has been tampered with. Alternatively or additionally, the movable member 607 can also trigger a visible tampering indicator, such as a light, once moved. The tampering indicator can be tripped by an engagement member removal detector within the unit 600. The engagement member removal detector, in one embodiment is a resistance meter that measures a low resistance path between the second portions 608a and 608b of the unit 600, such path being through the conductive sleeve 100 of the vehicle. Resistance meters, often referred to as ohm meters, are well known in the art and thus not described herein in detail. In other embodiments, the engagement member removal detector can be a mechanical device that detects when the second portions 608a and 608b are no longer in contact with sleeve.

Figure 8:
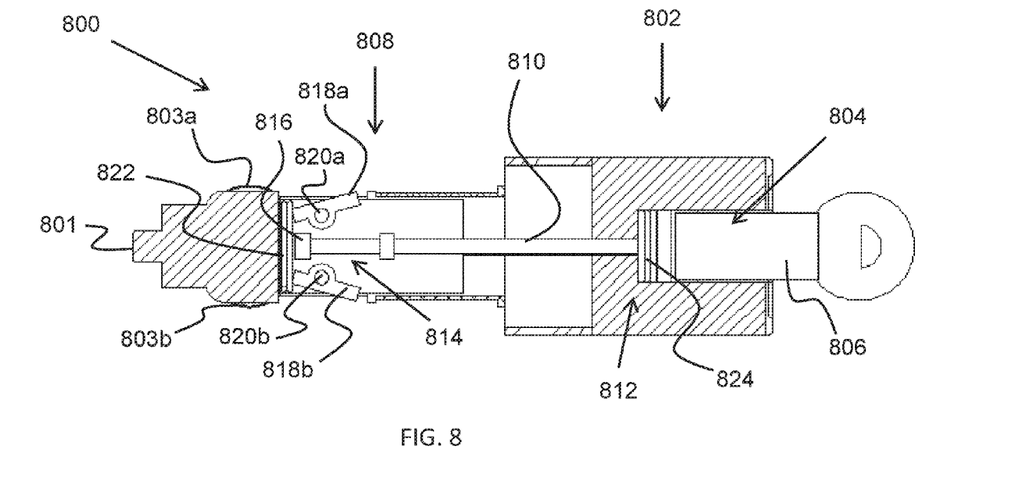
FIGS. 8 & 9 are elevational cross-sectional views of a wireless communication network access controller assembly having opposing engagement members and a tool for selectively extending/retracting the engagement members in accordance with the present invention.
Figure 9:
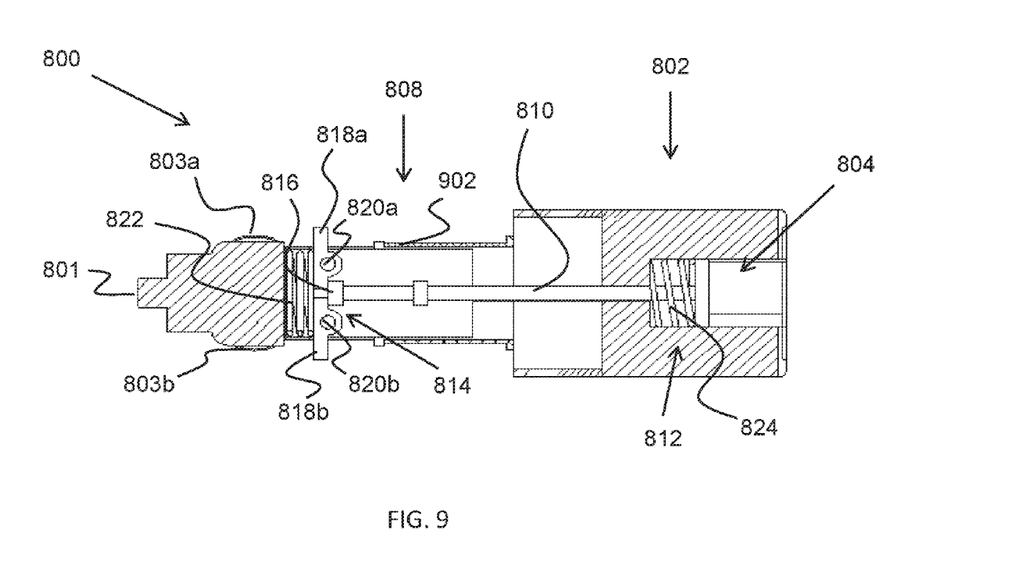

FIGS. 8 and 9 show cross-sectional elevational views of one embodiment of a locking wireless communication network access controller assembly 800 with engaging members that are selectively retracted/extended through use of a control key in accordance with the present invention. Referring first to FIG. 8, the RF wireless communication network access controller assembly 800 includes a head portion 802 that houses all or some of the circuitry schematically illustrated in FIG. 4. Coupled to the head portion 802 is a mating portion 808, which is the portion that is inserted within the sleeve 102 of the power port 100 of a vehicle. The mating portion 808 includes a first electrical contact 801 at its distal end and a pair of second electrical contacts 803a and 803b that expand away from the mating portion 808 and make spring biased electrical contact with the interior wall of a power port sleeve 102.

The head portion 802 features a port 804 shaped to accept a limited number of objects, preferably, only a unique key 806, and affects the wireless communication network access controller assembly's 800 ability to physically engage with the sleeve 102 and prevent removal of the wireless communication network access controller assembly 800 once it is installed.

A shaft 810 extends from the head portion 802 to the mating portion 808. The key 806, when inserted within the port 804, is able to engage the proximal end 812 of the shaft 810. In this embodiment, the engagement is the application of a lateral force upon the proximal end 812 of the shaft 810 toward the distal end 814 of the shaft 810. At the distal end 814 of the shaft 810 is a plunger 816. The plunger 816 makes physical contact with a set of pivot arms 818a and 818b that pivot upon axes 820a and 820b, respectively. A distal spring 822 exerts a biasing force upon the pivot arms 818a and 818b in a direction toward the proximal end 812 of the shaft 810. A proximal spring 824 exerts a biasing force upon the shaft 810 also in a direction away from the mating portion 808.

When a force is exerted upon the shaft 810 with the key 806, the force being sufficient to overcome the spring biasing force of both the proximal spring 824 and the distal spring 822, the shaft 810 is moved in a distal direction. This distal position is depicted in FIG. 8. Because the shaft 810 moved distally, it caused the movable members, i.e., arms 818a and 818b, to pivot upon their axes 820a and 820b, respectively, and withdraw at least partially into the mating portion 808. While in this position, the mating portion 808 can be easily inserted and withdrawn from a power port 100.

FIG. 9 shows a cross-sectional elevational view of the wireless communication network access controller assembly 800 with the key 806 removed. Once the key 806 is removed, the wireless communication network access controller assembly 800 moves to its locked position. More specifically, the biasing force from the proximal spring 824 causes the shaft 810 to slide in a proximal direction toward the head portion 802. As the shaft 810 slides, so too does the plunger 816. When the plunger 816 moves proximally, the biasing force from the distal spring 822 presses against the pivot arms 818a and 818b and causes them to pivot upon their axes 820a and 820b, respectively. Once the pivot arms 818a and 818b pivot upon their axes 820a and 820b, portions of the pivot arms 818a and 818b extend outwardly from the body 902 of the mating portion 808 of the wireless communication network access controller assembly 800. In this embodiment, the arms 818a and 818b are engagement members that selectively allow the device to be locked into the sleeve of the vehicle's power port or disengaged from the sleeve.

Advantageously, if the sleeve 102 of the power port 100 into which the mating portion 808 of the wireless communication network access controller assembly 800 is inserted does not have openings 106, the pivot arms 818a and 818b will simply remain in or only extend slightly out of the body 902 of the mating portion 808. The distal spring 822 will provide the pivot arms 818a and 818b with a spring bias pushing them against the sleeve surface. Pulling on the head portion 802 of the wireless communication network access controller assembly 800 will cause the outer edges of the pivot arms 818a and 818b to dig into the sleeve surface and resist removal of the wireless communication network access controller assembly 800. To properly remove the wireless communication network access controller assembly 800, the key 806 is simply inserted into the opening/port 804 and the pivot arms 818a and 818b are rotated back to the position shown in FIG. 8.

The invention also contemplates an intermediate piece that goes between the sleeve of the power port and the wireless communication network access controller assembly. In this embodiment, the intermediate piece acts as an engagement member for the wireless communication network access controller assembly 200, 500, 600, 800 and serves to create a locking relationship between the sleeve and the wireless communication network access controller assembly 200, 500, 600, 800.

Figure 11:
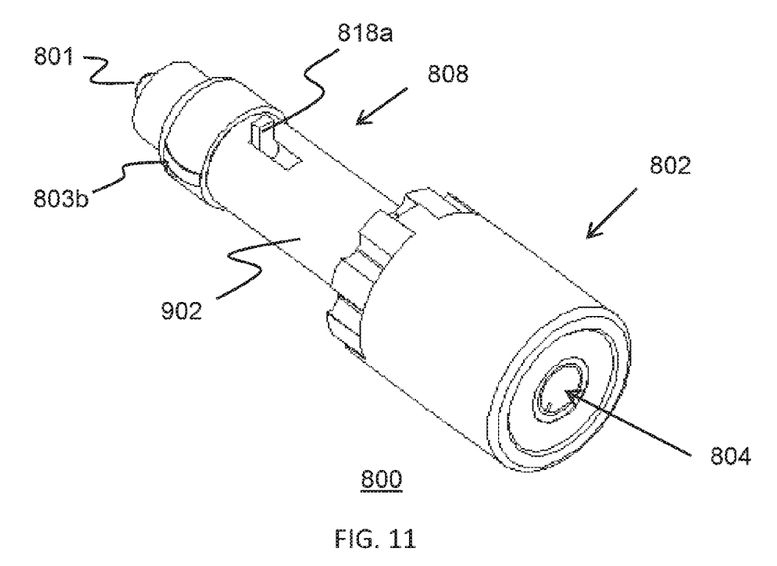
FIG. 11 provides a perspective view of the wireless communication network access controller assembly depicted in FIGS. 8 and 9.

FIG. 11 provides a perspective view of the communication blocking device depicted in FIGS. 8 and 9.

In further embodiments of the present invention, the wireless communication network access controller assembly 200, 500, 600, 800 includes short message service (SMS) transmitting capability. SMS is a text messaging service component of phone, web, or mobile communication systems, using standardized communications protocols that allow the exchange of short text messages between a mobile device, i.e., the wireless communication network access controller assembly 200, 500, 600, 800, and a fixed line or mobile phone device. The term SMS, as used herein, is intended to be a synonym for all types of messaging sent to a specific user device. With this capability, the installer of the device can be instantly notified of any tampering of the device by the driver or anyone else. In addition, the SMS capability can alert the installer or anyone else of an emergency situation, for example, when the driver presses the emergency disable button 210.

Furthermore, the present invention can be provided with a GPS receiver 417 that provides location information pertaining to the communication blocking device. The GPS and devices that utilize the GPS are well known to those of skill in the art. It is therefore not necessary to describe the GPS or GPS devices in great detail. The location information obtained through the provided GPS receiver 417 can be stored in the memory 414 and downloaded at a later time. The location information can also be transmitted via the above-described SMS communication or one of many other communication protocols. In addition, the GPS receiver 417 can be used by the device to determine when the vehicle is stationary, i.e., not moving. During periods when the vehicle is not moving, the communication blocking device can cease its communication blocking function and allow the operator to utilize his or her phone or other wireless device as desired. However, one the GPS receiver 417 detects movement of the vehicle, communication blocking operation is once again resumed.

Figure 10:
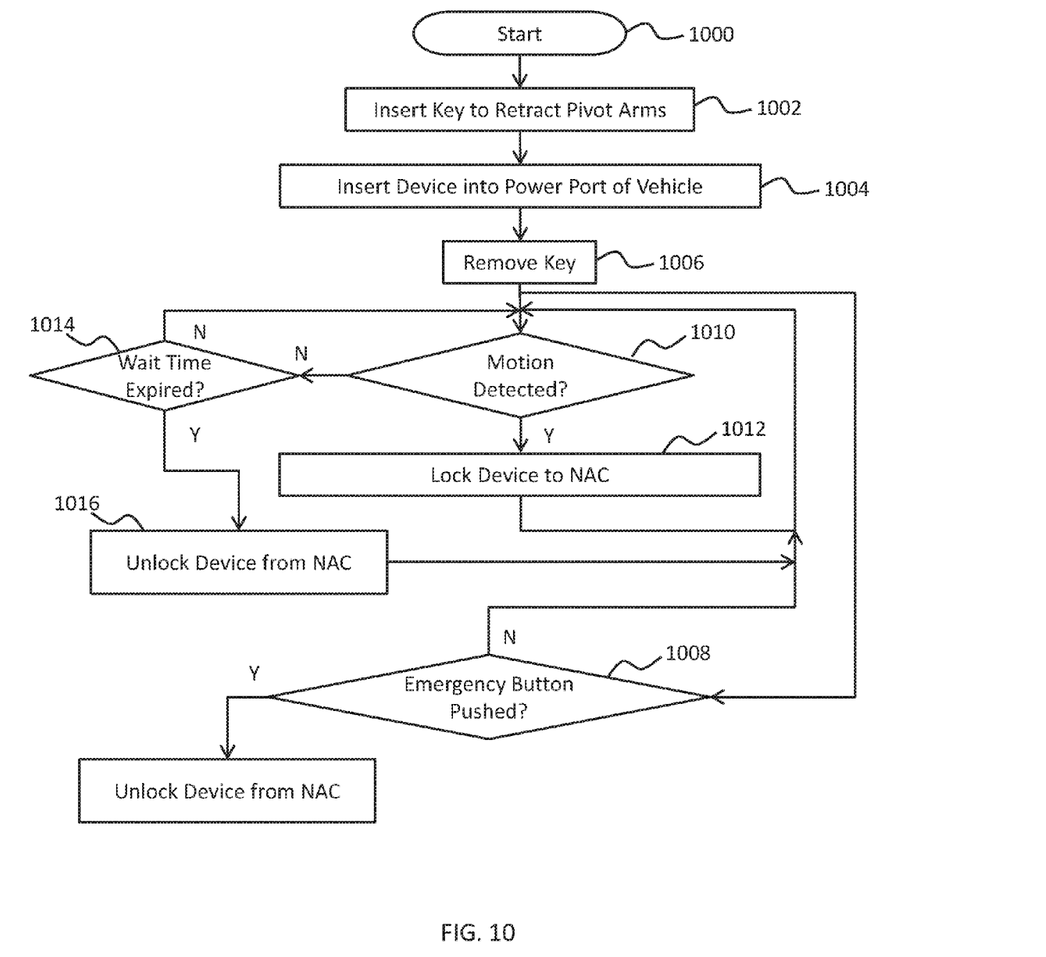
FIG. 10 is a process flow diagram of a method for preventing wireless communication while a vehicle is in motion in accordance with the present invention.

FIG. 10 provides a process flow diagram of one exemplary method of utilizing the present invention. The process begins at step 1000 and move directly to step 1002 where a key is inserted into the communication blocking device. As was explained above, utilizing the key places the communication blocking device into an insertable physical configuration that easily fits within a power port of a vehicle, e.g., car, plane, bus, boat, etc. In step 1004, the communication blocking device is placed within the power port of the vehicle. In step 1006, the key is removed from the communication blocking device. It should be noted that although the term "key" is used herein, the invention is not limited to standard keys, but can also include any tool for activating the device, such as a fingerprint detector, combination lock, and others. It should also be noted that, in some embodiments, the engagement members are designed to fold back against the assembly and fit into the power port sleeve without requiring a key to retract them. In this embodiment, a key would only be needed to remove the assembly.

In step 1010 a determination is made as to whether or not the device senses motion. If the answer to the query of step 1010 is yes, the NAC 400 broadcasts a signal that causes the mobile device 408 to lock onto it, thus preventing the mobile device from communication on the network. The process then returns to step 1010 to monitor whether or not motion continues to be identified.

If the result of the query in step 1010 is no, i.e., motion is not been sensed, the flow moves to step 1014 where a determination is made as to whether or not the wait time has expired. The wait time is an amount of time that must pass before the device allows the mobile device 408 to unlock from the NAC 400. For example, the wait time might be longer than the average time sitting at a stoplight. If the answer to the query in step 1014 is no, the process moves back to step 1010. However, if the answer to the query in step 1014 is yes, the flow moves to step 1016 were the NAC 400 allows the mobile device 408 to communicate through its cellular network. This allows a user of a mobile device within the vehicle in which the wireless communication network access controller assembly 200 is installed to safely engage in communication. The flow then returns to step 1010 where the device continues to monitor for motion.

In parallel with the above-describe process that takes place after step 1006, the device also continuously carries out step 1008 where a check is made as to whether or not the emergency button has been pushed. Activation of the emergency button moves the process to 1016 were the NAC 400 allows the device 408 to reconnect to the cellular network and resume normal operation. Once the communication blocking function is stopped due to detection of the emergency button being pushed, it no longer matters whether the device detects motion of the vehicle in while the device is installed. Activation of the emergency button instantly allows the user of the mobile device to engage in all communication and is not encumbered by the NAC 400 operation, which has ceased.

In accordance with another embodiment of the present invention, the wireless communication network access controller assembly 800 is provided with a GPS receiver and is paired with one or more mobile communication devices 408 that also have GPS capabilities. In this embodiment, the wireless communication network access controller assembly 800 is able to receive and interpret signals identifying the particular mobile communication device's location based on GPS signals transmitted by the device 408. When a determined distance between the paired mobile communication device(s) and the wireless communication network access controller assembly 800 is small enough, i.e., the mobile communication device 408 is in the vehicle, the wireless communication network access controller assembly 800 begins operation to lock the device 408 to the NAC 400.

In each of the embodiments described above and shown in the figures, an engagement member 208, 500, 608, 610, 818 was utilized to physically secure the wireless communication network access controller assembly 200, 500, 600, 800 to the sleeve 102 of the power port 100 of the vehicle in which it was installed, thereby rendering physical separation of the assembly 200, 500, 600, 800 and the power port 100 difficult. In other embodiments of the present invention, the engagement member is not used to physically prevent removal of the assembly 200, 500, 600, 800. In these embodiments, the engagement members are simply used to determine when the assembly is within the power port and when the assembly has been removed. In one embodiment, the engagement members are spring-biased outwards from the assembly so that, if the user, e.g., a teenager, removes the assembly from the power port, the engagement members extend away from the assembly further than they were extended when installed within the power port. The extending engagement members trip switches or position sensors inside the assembly to indicate a tamper state to the device, which then takes at least one of many available paths of alerting the installer of the device that it has been removed by the user of the vehicle. In other embodiments, the engagement members use the conductive power port sleeve 102 to sense when they are grounded to each other and when they are not. An open condition between the members can indicate a tamper state to the device, which then takes at least one of many available paths of alerting the installer of the device that it has been removed by the user of the vehicle. In either embodiment, an indicator light starts flashing, an audible alarm sounds, or any other indicator is used to communicate that the intended user of the device has removed it. This is helpful, for instance, to parents of a teenage driver so they will know their child's compliance with their instruction to drive with the presently inventive assembly installed in and powered by the power port of the vehicle being driven by the teenager. If the teenager fails to comply, the parents will know and can take other steps, such as preventing the teenager from driving at all, or cancelling his cellular phone subscription.

FIG. 12 provides an exemplary process flow diagrams showing one method for carrying out the present invention. Each step therein is optional and can be omitted, reordered with the other steps, or preceded or followed by steps not shown in FIG. 12. The process starts at step 1200 and moves directly to step 1202, where a mobile device 408 locks itself to a standard wireless network 402. In step 1204, the NAC 400 powers up and broadcasts a signal that is received by the mobile device 408. The NAC 400 implements a mimicked signal that follows the signal patterns, parameters, and characteristics of the underlying wireless network 402. In step 1206, after receiving the signal from the NAC 400, the mobile device 408 tunes to and accepts the local signal broadcast of the NAC 400. In this step, the NAC 400 provides indications to the mobile device 408 to make it appear that the mobile device 408 is actually registered with a base station on its own wireless network 402 that, under normal circumstances, would provide service to the mobile device 408. Once the mobile device 408 is locked to the NAC 400, the process can begin control loop 1208 where it checks for a mobile device 408 release event, such as a push of the emergency button 210 or expiration of the timer 436. If a release event is identified, the process proceeds to step 1202, where the mobile device 408 locks onto the standard wireless network 402 again. This is due to the fact that, upon a release event, the NAC 400 stops transmitting and the strongest signal received by the mobile device 408 will once again be that from the wireless network 402. The mobile device 408 is then able to place normal calls. On the other hand, if during loop 1204 a release event is not identified, the mobile device 408 remains locked to the NAC 400 and is unable to communicate via the wireless network 402. In other words, while the NAC 400 is operating and the mobile device 408 is prevented from communicating on the mobile network 402, the user of the wireless device 408 is unable to send or receive text messages and is, therefore, prevented from distracting themselves while driving.

A wireless communication network access controller assembly has been disclosed that quickly and easily installs within a vehicle without the need for physical alteration of any portion of the vehicle or special wiring. Once installed, the assembly cannot be easily removed by the user, which forces him or her to refrain from engaging in dangerous mobile communication while the car is in motion. Several optional features of the present invention allow for easy identification of attempts to disable the inventive device. The device also provides one or more reliable ways of disabling the communication blocking function, namely, turning the vehicle off and removing the key, pulling over to the side of the road and allowing the vehicle to remain stationary for a predetermined number of minutes, and activation of an emergency button.

What is claimed is:

1. A wireless communication network access controller assembly comprising:
   a first portion shaped to fit within a power port of a vehicle;
   at least one engagement member having:
      a retracted position; and
      an extended position that extends outwardly from the first portion and places the at least one engagement member in a coupling arrangement with a portion of the power port of the vehicle;
   a second portion having a locking mechanism operable to selectively move the at least one engagement member from the extended position to the retracted position; and
   a network access controller coupled to at least one of the first portion and the second portion, the network access controller operable to create a local wireless network that is an overlay to a part of an existing wireless network and that prevents wireless communications access to the existing wireless network.

2. The wireless communication network access controller assembly according to claim 1, further comprising:
   an accelerometer communicatively coupled to the network access controller and operable to detect motion of the vehicle.

3. The wireless communication network access controller assembly according to claim 2, further comprising:
   a processor communicatively coupled to the accelerometer and the network access controller and operable to alter a state of the network access controller based on a signal received from the accelerometer.

4. The wireless communication network access controller assembly according to claim 3, further comprising:
   a timer communicatively coupled to the processor, wherein the processor measures a predefined amount of time after receiving a no-motion signal from the accelerometer and before altering the state of the network access controller.

5. The wireless communication network access controller assembly according to claim 1, wherein:
   the engagement member is a pivotable arm.

6. The wireless communication network access controller assembly according to claim 1, wherein:
   the engagement member is an expandable coupler.

7. The wireless communication network access controller assembly according to claim 1, further comprising:
   an indicator at the second portion at least one of visually and audibly indicating that the wireless communication network access controller assembly was tampered with.

8. The wireless communication network access controller assembly according to claim 7, further comprising:

a detector coupled to the indicator, the detector operable to detect a force applied to the wireless communication network access controller assembly in a direction away from the power port.

9. The wireless communication network access controller assembly according to claim 7, further comprising:
a detector coupled to the indicator, the detector operable to detect a variation of a predefined standing wave ratio at the wireless communication network access controller assembly.

10. The wireless communication network access controller assembly according to claim 1, further comprising:
an emergency shut-off switch operable to disable the network access controller; and
an indicator at least one of visually and audibly indicating that the emergency shut-off switch has been activated.

11. A method of preventing wireless communication while a vehicle is in motion, the method comprising:
providing a wireless communication network access controller assembly comprising:
a first portion shaped to fit within a power port of a vehicle;
at least one engagement member having:
a retracted position; and
an extended position that extends outwardly from the first portion and places the at least one engagement member in a coupling arrangement with a portion of the power port of the vehicle;
a second portion having a locking mechanism operable to selectively move the at least one engagement member from the extended position to the retracted position; and
a network access controller coupled to at least one of the first portion and the second portion, the network access controller operable to create a local wireless network that is an overlay to a part of an existing wireless network and that prevents wireless communications access to the existing wireless network,
manipulating the locking mechanism to a first position where the at least one engagement member is in the retracted position;
inserting the first portion within the power port; and
manipulating the locking mechanism to a second position where the at least one engagement member is in the extended position and in a mating relationship with the portion of the power port.

12. The method according to claim 11, further comprising:
detecting an absence of motion of the vehicle; and
ceasing operation of the network access controller when the absence of motion of the vehicle is detected.

13. The method according to claim 12, further comprising:
waiting a predefined amount of time after detecting the absence of motion of the vehicle before ceasing operation of the network access controller.

14. The method according to claim 11, wherein:
the engagement member is a pivotable arm.

15. The method according to claim 11, wherein:
the engagement member is an expandable coupler.

16. The method according to claim 11, further comprising:
sensing a removing force applied to the wireless communication network access controller assembly; and
activating a tampering indicator on the wireless communication network access controller assembly.

17. A wireless communication network access controller assembly comprising:
a body shaped to fit within a power port of a vehicle;
at least one engagement member having an extended position that extends outwardly from the body and places the at least one engagement member in a coupling arrangement with a portion of the power port of the vehicle;
a network access controller coupled to the body, the network access controller operable to create a local wireless network that is an overlay to a part of an existing wireless network and that prevents wireless communications access to the existing wireless network;
an engagement member removal detector operable to determine when the engagement member is no longer in a coupling arrangement with the power port of the vehicle; and
a tamper indicator coupled to the engagement member removal detector and operable to indicate the engagement member removal detector determined the engagement member was not in a coupling arrangement with the power port of the vehicle.

18. The wireless communication network access controller assembly according to claim 17, wherein:
the at least one engagement member is at least two conductive members that form a closed circuit when both members are in contact with a sleeve of the power port of the vehicle.

19. The wireless communication network access controller assembly according to claim 17, wherein:
the engagement member removal detector senses when the at least one engagement member extends further than the extended position.

20. The wireless communication network access controller assembly according to claim 17, wherein:
the tamper indicator is at least one of a light, an audible alert, and a wireless communication.

* * * * *